US011228887B2

(12) United States Patent
Kesavan et al.

(10) Patent No.: US 11,228,887 B2
(45) Date of Patent: Jan. 18, 2022

(54) INTERNET OF THINGS DEVICE HIERARCHIES

(71) Applicant: Intel IP Corporation, Santa Clara, CA (US)

(72) Inventors: Vijay Sarathi Kesavan, Portland, OR (US); Sudarshan Prasad, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 16/814,817

(22) Filed: Mar. 10, 2020

(65) Prior Publication Data

US 2021/0037364 A1 Feb. 4, 2021

Related U.S. Application Data

(63) Continuation of application No. 14/866,357, filed on Sep. 25, 2015, now Pat. No. 10,652,716.

(51) Int. Cl.
*G06F 15/16* (2006.01)
*H04W 4/70* (2018.01)
(Continued)

(52) U.S. Cl.
CPC ........... *H04W 4/70* (2018.02); *H04L 41/0893* (2013.01); *H04L 41/12* (2013.01);
(Continued)

(58) Field of Classification Search
CPC . H04L 41/0886; H04L 41/0893; H04L 41/12; H04L 61/306; H04L 67/12; H04W 4/33; H04W 4/70
See application file for complete search history.

(56) References Cited

U.S. PATENT DOCUMENTS 10,652,716 B2   5/2020 Kesavan et al.
2014/0241354 A1* 8/2014 Shuman ................ H04L 12/281
                                                370/390
(Continued)

FOREIGN PATENT DOCUMENTS

WO       2014130568       8/2014

OTHER PUBLICATIONS

International Searching Authority, "Written Opinion," issued in connection with International Patent Application No. PCT/US2016/048571, dated Nov. 25, 2016, 8 pages. International Searching Authority, "Written Search Report," issued in connection with International Patent Application No. PCT/US2016/048571, dated Nov. 25, 2016, 3 pages.
European Patent Office, "Decsision to grant," issued in connection with European Patent Application No. 16849279.1, dated Feb. 6, 2020, 2 pages.
(Continued)

*Primary Examiner* — Normin Abedin
(74) *Attorney, Agent, or Firm* — Hanley, Flight & Zimmerman, LLC

(57) ABSTRACT

In embodiments, Internet of Things (IoT) devices may be organized according to an IoT device hierarchy, which may include parent and/or child associations between resources associated with IoT devices and/or with groupings of IoT devices. IoT devices wishing to support an IoT device hierarchy may utilize an extended IoT device resource model which provides for IoT device hierarchy information and interfaces to be provided by supporting IoT devices. A supporting resource may have one or more parent properties and/or child properties which may identify, respectively, parent or child resources which are associated with the resource. In various embodiments, these parent properties and/or child properties may include uniform resource identifiers (URI). A supporting resource may also identify an interface type for a hierarchical access interface, through which one or more descendant resources may be accessed (Continued)

through a single command. Other embodiments may be descried and/or claimed.

21 Claims, 9 Drawing Sheets

(51) Int. Cl.
*H04L 12/24* (2006.01)
*H04W 4/33* (2018.01)
*H04L 29/08* (2006.01)
*H04L 29/12* (2006.01)

(52) U.S. Cl.
CPC ........ *H04L 41/0886* (2013.01); *H04L 61/306* (2013.01); *H04L 67/12* (2013.01); *H04W 4/33* (2018.02)

(56) References Cited

U.S. PATENT DOCUMENTS

| | | |
|---|---|---|
| 2014/0244833 A1 | 8/2014 | Sharma et al. |
| 2014/0330929 A1 | 11/2014 | Dong et al. |
| 2015/0067154 A1 | 3/2015 | Ly et al. |
| 2015/0227618 A1* | 8/2015 | Dong ............... H04L 67/16 707/736 |
| 2017/0093861 A1 | 3/2017 | Kesavan et al. |

OTHER PUBLICATIONS

European Patent Office, "Supplementary European Search Report," issued in connection with European Patent No. 16849279, dated Jan. 24, 2019, 2 pages.

United States Patent and Trademark Office, "Non-Final Office Action," issued in connection with U.S. Appl. No. 14/866,357, dated Mar. 7, 2019, 11 pages.

United States Patent and Trademark Office, "Final Office Action." issued in connection with U.S. Appl. No. 14/866,357, dated Mar. 9, 2019, 12 pages.

United States Patent and Trademark Office, "Notice of Allowance," issued in connection with U.S. Appl. No. 14/866,357, dated Dec. 3, 2019, 15 pages.

United States Patent and Trademark Office, "Corrected Notice of Allowability" issued in connection with U.S. Appl. No. 14/866,357, dated Feb. 19, 2020, 3 pages.

* cited by examiner

INTERNET OF THINGS DEVICE HIERARCHIES

RELATED APPLICATIONS

This application is a continuation of U.S. application Ser. No. 14/866,357, filed Sep. 25, 2015, entitled "INTERNET OF THINGS DEVICE HIERARCHIES", and claims priority to the U.S. application Ser. No. 14/866,357 application. The contents of the U.S. application Ser. No. 14/866,357 application is hereby incorporated by reference herein in its entirety for all purposes.

TECHNICAL FIELD

The present disclosure relates to the field of data processing, in particular, to apparatuses, methods and storage media associated with accessing Internet of Things (IoT) devices.

BACKGROUND

The background description provided herein is for the purpose of generally presenting the context of the disclosure. Unless otherwise indicated herein, the materials described in this section are not prior art to the claims in this application and are not admitted to be prior art by inclusion in this section.

Computing devices continue to proliferate as there are greater and greater calls for computing power to be introduced into everyday devices and situations. Society continues to increase progress toward the "Internet of Things" (IoT), with its promise of ubiquitous computing availability in buildings, objects, spaces, etc. However, with the proliferation of IoT devices for home and business environments, managing and maintaining such devices threatens to become a daunting task. For example, oftentimes devices may be located in many different locations throughout a building or space; it may be difficult to identify these scattered devices. Further, users or systems may oftentimes need to access multiple devices of a particular type at once. For example, a user may desire to turn on all IoT-enabled lights in a particular section of a building. It can be daunting to identify, locate, and then access IoT devices when these devices are not well-organized.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example, and not by way of limitation, in the Figures of the accompanying drawings.

DETAILED DESCRIPTION

Figure 1:
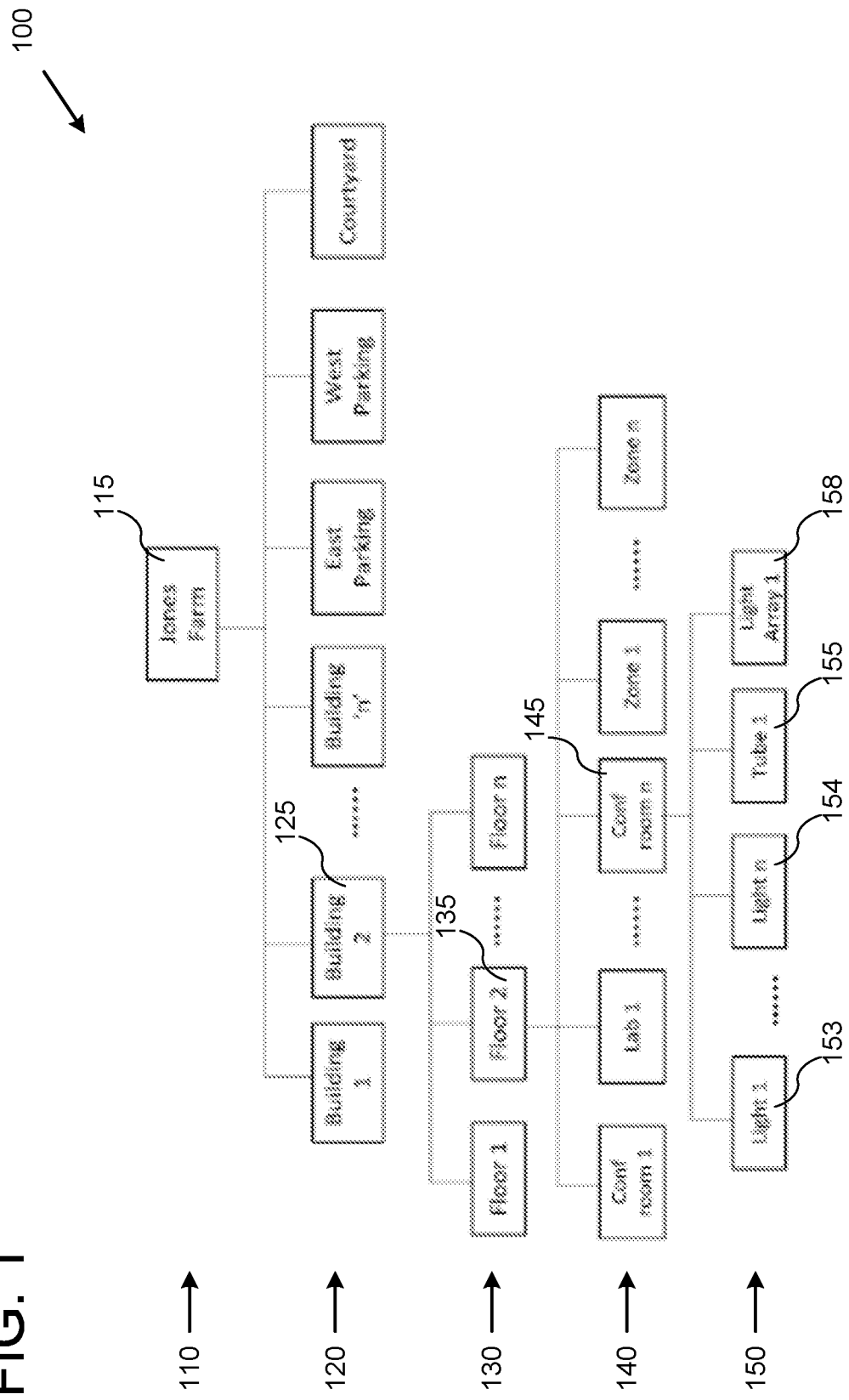
FIG. 1 illustrates an example IoT device hierarchy, in accordance with various embodiments.

In the following detailed description, reference is made to the accompanying drawings which form a part hereof wherein like numerals designate like parts throughout, and in which is shown by way of illustration embodiments that may be practiced. It is to be understood that other embodiments may be utilized and structural or logical changes may be made without departing from the scope of the present disclosure. Therefore, the following detailed description is not to be taken in a limiting sense, and the scope of embodiments is defined by the appended claims and their equivalents.

Various operations may be described as multiple discrete actions or operations in turn, in a manner that is most helpful in understanding the claimed subject matter. However, the order of description should not be construed as to imply that these operations are necessarily order dependent. In particular, these operations may not be performed in the order of presentation. Operations described may be performed in a different order than the described embodiment. Various additional operations may be performed and/or described operations may be omitted in additional embodiments.

For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B and C).

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

As used herein, the term "logic" and "module" may refer to, be part of, or include an Application Specific Integrated Circuit (ASIC), an electronic circuit, a processor (shared, dedicated, or group) and/or memory (shared, dedicated, or group) that execute one or more software or firmware programs, a combinational logic circuit, and/or other suitable components that provide the described functionality. As described herein, the term "logic" and "module" may refer to, be part of, or include a System on a Chip, as described below.

In various embodiments, IoT devices may be organized according to an IoT device hierarchy. In various embodiments, the IoT device hierarchy may include parent and/or child associations between resources associated with IoT devices and/or with groupings of IoT devices. In various embodiments, the hierarchy may take the form of a tree, where resources of an IoT device may have one or more children associated with it, while some resources (such as leaves in the tree hierarchy) may have no associated children. In such tree embodiments, each resource may have up to one associated parent resource (or no parent, in the case of a top-level resource), thus forming branching tree structures. However, in other embodiment, resources of IoT devices may be organized to be associated with multiple parent resources.

In various embodiments, resources in IoT device hierarchies may be organized using extensions to a resource model for a resource of an IoT device. In such embodiments, IoT devices wishing to support an IoT device hierarchy may utilize an extended IoT device resource model which provides for IoT device hierarchy information and interfaces to be provided by supporting IoT devices. Examples of this information are provided below. In various embodiments, by extending a resource model for a resource to include IoT device hierarchy information, an IoT device which is to be utilized in an IoT device hierarchy may thus be utilized alongside other IoT devices or by IoT applications which do not support IoT device hierarchies without requiring the non-supporting devices or applications to be modified.

Thus, in various embodiments, a supporting resource may have one or more parent properties and/or child properties which may identify, respectively, parent or child resources which are associated with the resource. In various embodiments, these parent properties and/or child properties may include uniform resource identifiers (URI) for the relevant parent or child resources. In such embodiments, the properties may be referred to as parent URI properties or child URI properties. In various embodiments a supporting resource may also identify an interface type for a hierarchical access interface. In various embodiments, through use of the hierarchical access interface implemented by a device, one or more descendant resources may be accessed through a single command, thus providing for wider-scale access than through other techniques.

In various embodiments, IoT devices described herein may include various forms and types of devices, including, but not limited to, laptop computers, mobile devices such as mobile phones, tablets, etc. wearable devices such as computing-enabled glasses or watches as well as other devices, such as computing-enabled light bulbs, thermostats, televisions, refrigerators, microwave ovens, convectional ovens, wine refrigerators, etc. Additionally, while the term "computing devices" is used throughout to refer to devices and/or objects that have computing capabilities, no particular limitation should be inferred by this usage. Thus, in various embodiments, the "computing devices" referred to herein may include desktop or laptop computers, mobile devices, computing-capable sensors (e.g. thermometers, light sensors, etc.), computing-capable appliances (e.g., refrigerators), home automation equipment, vehicles, audio/visual equipment, etc. Additionally, the term "resource" as used herein may include logical representations of physical items, including computing devices and various non-computing devices, such as, but not limited to, lighting elements, bulbs, fans, appliances, etc. The term "resource" may also include logical representations of non-physical items, such as spaces or locations. The term "resource" may also include groupings of physical and/or non-physical items such as, but not limited to, groupings of devices, spaces, or locations. For example, a resource may be associated with a building or floor of a building, and may have associated resource children which are located in that building or on that floor. Thus, using IoT device hierarchy techniques described herein, multiple resources associated with a particular location or area may be identified or accessed through a parent resource that models that location or area. Examples of such access are described below.

It may be noted, that, through the use of resources to represent devices and/or groupings of devices, the IoT device hierarchy techniques described herein may provide for hierarchies that are orthogonal to any particular groupings of resources. Thus, an IoT hierarchy may include parent/child relationships between devices, between groupings or other logical representations of devices, or between groupings themselves.

Referring now to FIG. 1, an example IoT device hierarchy 100 is illustrated in accordance with various embodiments. In the particular example of FIG. 1, the IoT device hierarchy 100 includes a hierarchical structure of resources of a set of buildings, referred to as "Jones Farm". In particular, it may be noted that the IoT device hierarchy 100 includes a root level 110 with a resource 115 representing the entire Jones Farm. The IoT device hierarchy 100 also includes a second level 120 which includes multiple building resources. In the example of FIG. 1, each of the building resources in level 120 is associated with the Jones Farm resource 125 as a parent resource. Conversely resource 125, which is for Building 2 of Jones Farm, is associated with multiple children resources at level 130, each of which (in the example) represents a floor of Building 2. Resource 135, which represents Floor 2 of Building 2, in turn is associated with multiple resources representing rooms, such as resource 145, which represents Conference room n. Resource 145 is associated with multiple IoT devices that are physically present in Conference Room n, including Lights 1 through n, which are resources 153 and 154 in the IoT device hierarchy 100, Tube 1, which is resource 155, and light array 1, which is resource 158.

Figure 2:
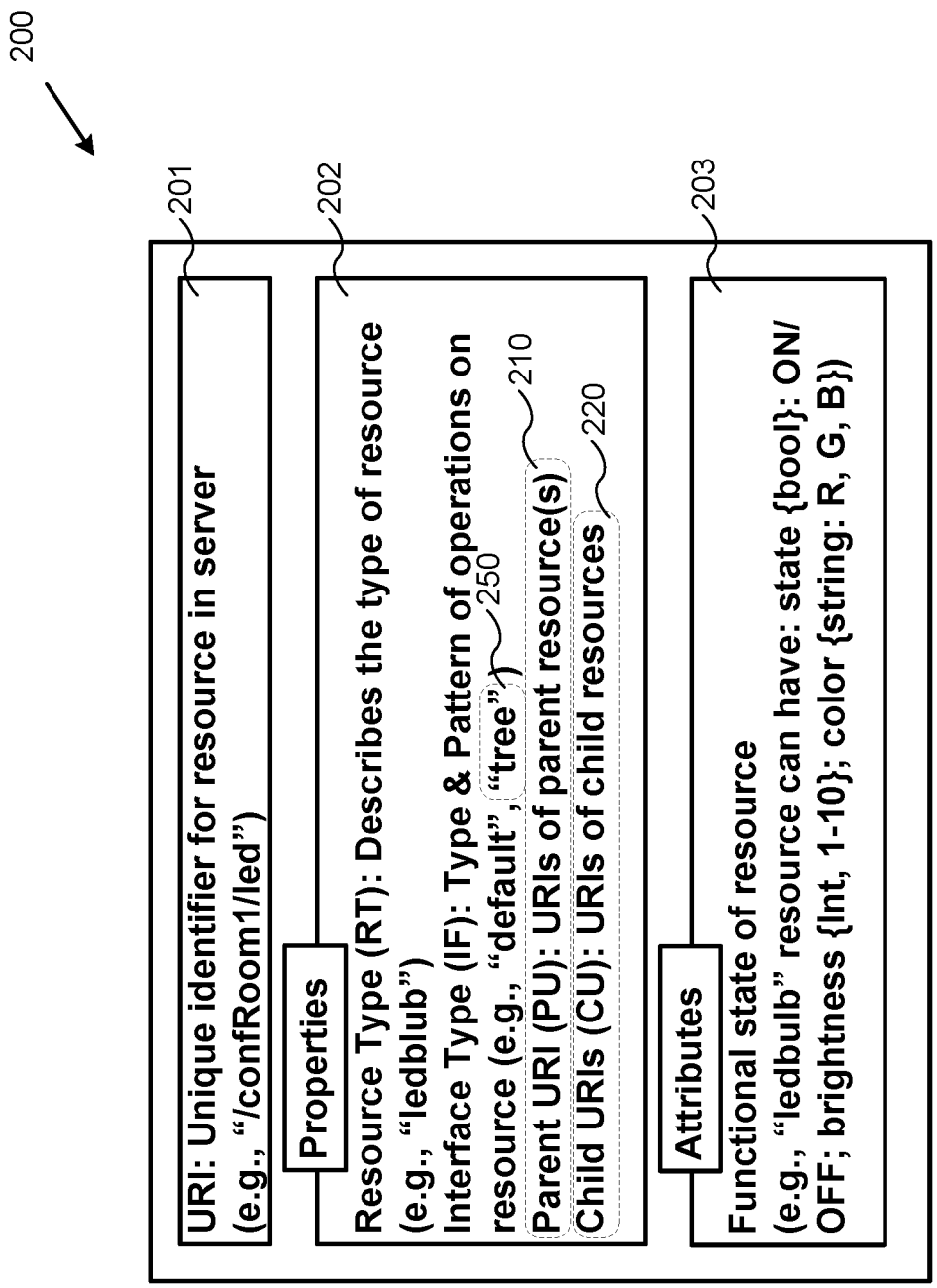
FIG. 2 illustrates an example extension of a resource model for an IoT device to support an IoT device hierarchy, in accordance with various embodiments.

Referring now to FIG. 2, an example extension of a resource model 200 for an IoT device to support an IoT device hierarchy is illustrated in accordance with various embodiments. In various embodiments, the resource model may contain one or more elements that may be utilized by known resource models for representation of IoT devices, either with or without IoT device hierarchy support. Thus, in the example of FIG. 2, an Open Interconnect Consortium ("OIC") resource model is illustrated, along with extensions to the model implementing the techniques described herein. However, in various embodiments, techniques described herein may be utilized with other IoT models, such as, for example a Constrained Application Protocol ("CoAP") or an HTTP resource model, as may be understood.

Thus, for example, the resource model 200 may include a URI 201, which may provide a unique identifier for a resource on a server. In the example of FIG. 2, a light-emitting diode (LED) light bulb may have a URI 201 of "/confRoom1//led". The resource model may also include one or more properties 202 describing the resource. For example, a resource may include one or more Resource Type properties that may describe types for the resource (for example, "ledbulb"). The resource may also include one or more Interface Types that may describe interfaces that are supported by the resource. For example, an LED bulb device may implement a "default" interface, which may be understood to provide basic access to state information and/or the ability to change a state of the LED bulb. In another example, the resource model 200 may include one or more attributes 203 that record a functional state of the resource. For example, the LED bulb may have a State attribute which has a Boolean ON/OFF value, a Brightness value of 1-10, and/or a color value represented by a string of red, green, and blue values. In various embodiments, other aspects of these elements resource model 200 may be known, and thus will not be belabored herein.

In various embodiments, in order to support IoT device hierarchies, the resource model 200 may include one or more extensions which may provide facility for IoT device hierarchy support. In the example of FIG. 2, these extensions are provided as new properties 210, 220, and 250, and are marked out using dashed rounded boxes. In various embodiments, the resource model 200 may include parent and child properties which refer, respectively to other resources that are associated in the IoT device hierarchy as parents or children of the resource using the resource model 200. In particular, the resource model 200 may include a Parent URI property (PU) 210, which may include URI references to a parent resource. For example, in FIG. 1, the Tube 1 resource 155 may have a PU 210 which provides a URI to the Conference room n resource 145. The resource model 200 may also include one or more Child URI properties (CU) 220, which may include URI references to one or more child resources. For example, in FIG. 1, the Floor 2 resource 135 may have a CU 220 which provides a URI to the Conference room n resource 145. While it may be noted that, in the example of FIG. 2, a PU 210 is provided while multiple CU 220s may be provided, in various embodiments, the resource model 200 may be extended to utilize multiple PU 210s.

In various embodiments, the resource model may also include a hierarchical access interface (HAI) 250. In various embodiments, implementation of the HAI 250 by an IoT device may be indicated in the resource model by an Interface Type, such as the "tree" Interface Type illustrated. In various embodiments, the HAI 250 may provide for access to multiple resources which are descendants of a resource in an IoT device hierarchy. In various embodiments, the term "descendant" may be used to refer to one or more resources which are at a lower level in an IoT device hierarchy than a given resource. For example, descendants of a resource may include its children, children of its children, etc. In various embodiments, the HAI 250 may provide for access to all resources that are descendants of a resource, or a sub-set thereof. In various embodiments, the HAI 250 may provide for access to a sub-set of resources by providing access to those resources that match a particular property or set of properties. For example, if a client application intends to turn a set of LED lights on a Floor 1 (using a resource with URI "/floor/1") to color "R" with brightness 2, this may be performed using a known "PUT" command to set a state of all LED resources which are descendants of the Floor 2:

PUT coap://1.1.1.1/floor/1?IF=tree&RT=ledbulb {Payload:state=ON,brightness=2,color=R}

Using this command, in various embodiments, every descendant resource that matches the Resource Type "ledbulb" may be set to ON with power 2 and color "R". This may be true even if some intervening descendants in the IoT device hierarchy do not match Resource Type "ledbulb". For example, while resource 145 for Conference room n may not match the Resource Type "LED", the above-command may still provide that LED resources that are descendants of resource 145 may still be turned on. In various embodiments, resource types may be added to resources in order to associate those resources together in a group. For example, all external lights may be associated with an "external" Resource Type and the HAI 250 may be utilized to turn on all lights that match this Resource Type.

Figure 3:
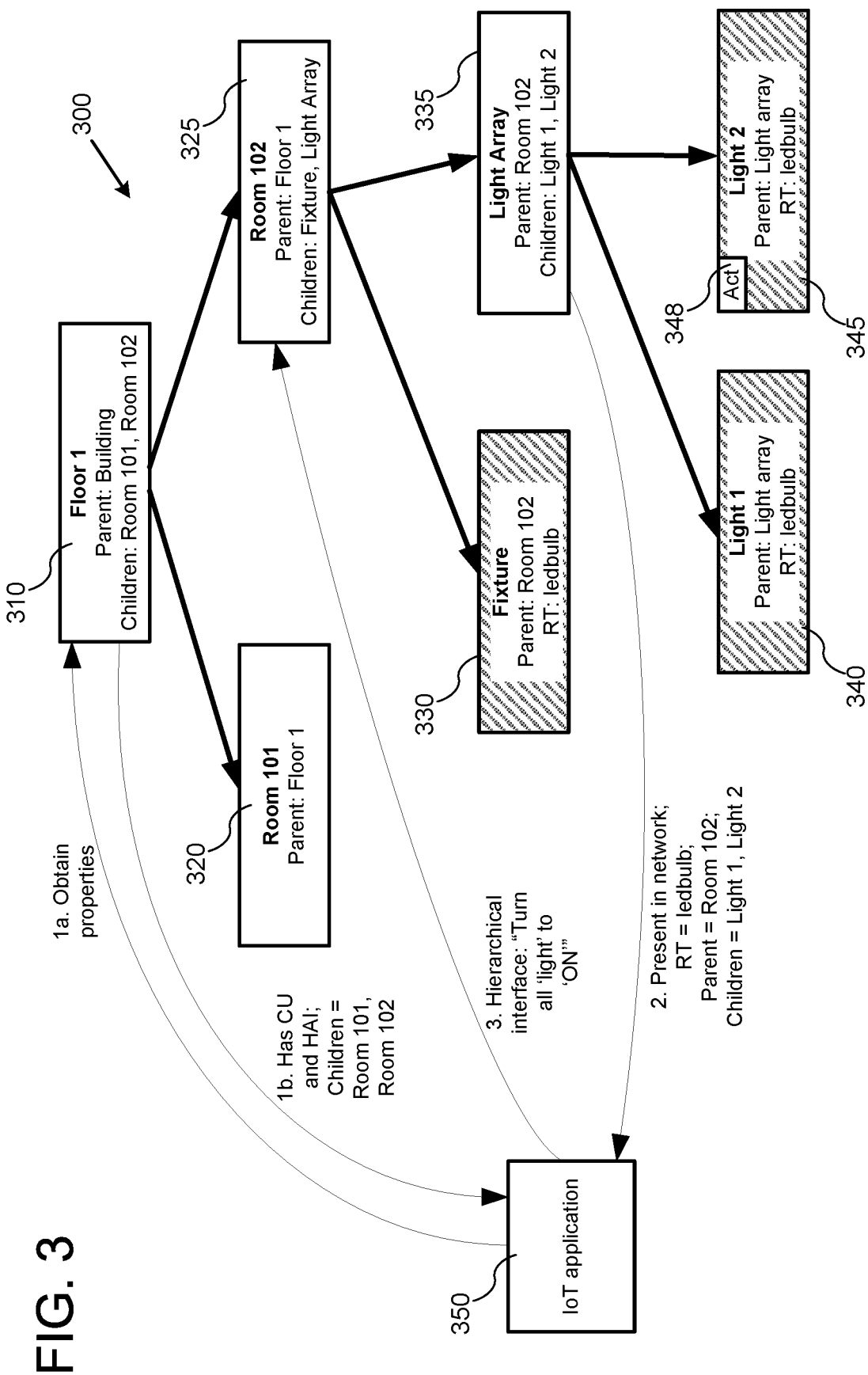
FIG. 3 illustrates example information flows between an IoT client application and IoT devices in an IoT device hierarchy, in accordance with various embodiments.

Referring now to FIG. 3, example information flows between an IoT client application 350 and IoT devices in an IoT device hierarchy 300 are shown in accordance with various embodiments. FIG. 3 illustrates various examples of the IoT client application 350 accessing one or more resources in the IoT device hierarchy 300 according to various embodiments. In various embodiments, the IoT client application may be implemented in various form factors and on types of equipment, including, but not limited to, laptops or desktop computers, mobile devices, smartphones, tablet computers, etc. Additionally, in various embodiments, the IoT client application 350 may be configured to access IoT device resources in the IoT device hierarchy 300 using various known methods, which may be extended according to IoT device hierarchy techniques described herein. For example, in various embodiments, the IoT client application 350 may be configured to perform GET or PUT commands, which may, respectively, retrieve or set attributes of IoT resources, as may be understood. It may be understood that, while only particular resources are illustrated in FIG. 3 for the purposes of simplified illustration, in various embodiments the illustrated resources may only represent a sub-set of possible resources for an IoT infrastructure.

In the example of FIG. 3, an example resource 310 for Floor 1 is shown. The resource 310 is associated with two child resources 320 and 325, which are associated with Room 101 and Room 102 on Floor 1, respectively. Room 102 is associated with two child resources, resource 330, which is associated with a Fixture in Room 102, and resource 335, which is associated with a Light Array in Room 102. The resource 335 is itself associated with two ledbulb resources, resources 340 and 345. As illustrated in FIG. 3, one or more of the IoT resources may have an actuator, such as actuator 348 of resource 345, which may be configured to set attributes of the resource, as may be understood. It may be understood that, for the purposes of simplified illustration, that only particular properties are illustrated relative to each illustrated resource. Additionally, it may be noted that the particular example illustrates hierarchical relationships between resources representing groupings of other resources (e.g., the relationship between resources 310 and 325) and between a grouping and a device (e.g., the relationship between resources 335 and 348). However, in other scenarios, hierarchical relationships may also exist between devices, and groupings may exist outside of hierarchical relationships (such as if resources are grouped by having a resource type in common).

FIG. 3 illustrates three examples of how the IoT client application may access IoT device resources in accordance with various embodiments. In the first, the IoT client application 350 may obtain properties for a resource, and receive one or more properties of the resource. In various embodiments, properties may be obtained using various techniques, such as by performing resource discovery, as may be understood. An example of such interaction may be found at interactions 1a and 1b in FIG. 3. At interaction 1a, the IoT client application 350 has made a property request (e.g. a GET command) to the resource 310, which represents the Floor 1 in the IoT device hierarchy 300. In response to this property request, at interaction 1b, the resource 310 has replied with a set of properties exhibited by the resource. In this example, the resource has CU 220 properties and HAI 250 Interface Type properties, thus indicating to the client application 350 that it supports the IoT device hierarchy techniques described herein. Further, the resource 310 provides the values of its CU 220 properties, which include references (e.g. URIs) to its child resources, resource 320 and resource 325 (for Room 101 and Room 102, respectively). Through this interaction, the IoT client application 300 may determine that the resource 310 supports IoT device hierarchy techniques, as well as a portion of the structure of the IoT device hierarchy 300 to which the resource 310 belongs.

In another example interaction, a device may provide IoT device hierarchy information on its own, such as when entering or leaving a network or IoT device hierarchy. For example, when an IoT device is introduced to an IoT device network a resource of the device may, in various scenarios, make it presence known by broadcasting device information to other IoT devices and/or IoT client applications, as maybe understood. In other scenarios, when an IoT device goes offline, such as when it is turned off or has an error, a resource may announce its imminent removal from the network. In various embodiments, however, the resource may provide IoT device hierarchy information when broadcasting presence or removal. For example, in interaction 2 of FIG. 3, resource 335 may have been recently brought into the IoT device hierarchy 300. In response to joining the IoT device hierarchy, the resource 335 announces its presence and includes in that announcement its resource type, PU 210, and CU 220s. In this case, the resource 335 announces that it is associated with resource 325 (Room 102) as a parent and resources 340 and 345 (Light 1 and Light 2, respectively) as child resources. In each case, in various embodiments, the resource may provide URIs to the parent and/or child resources.

In yet another interaction, the IoT client application may utilize the HAI 250 to set one or more properties of the IoT device hierarchy 300. In particular, as discussed above, the HAI 250 may be utilized to set an attribute of descendants (e.g. all descendants or a sub-set thereof) of a particular resource. In the example of interaction 3 of FIG. 3, the IoT client application 300 uses the HAI 250 of the resource 325 to set all "light" resources to "ON". In this example, all descendants of resource 325 which have the "light" property are then turned on, e.g., resources 330, 340, and 345 are turned on (as illustrated in FIG. 3 by the diagonal pattern). However, no action is taken on resource 335, which does not exhibit the "light" property.

Figure 4:
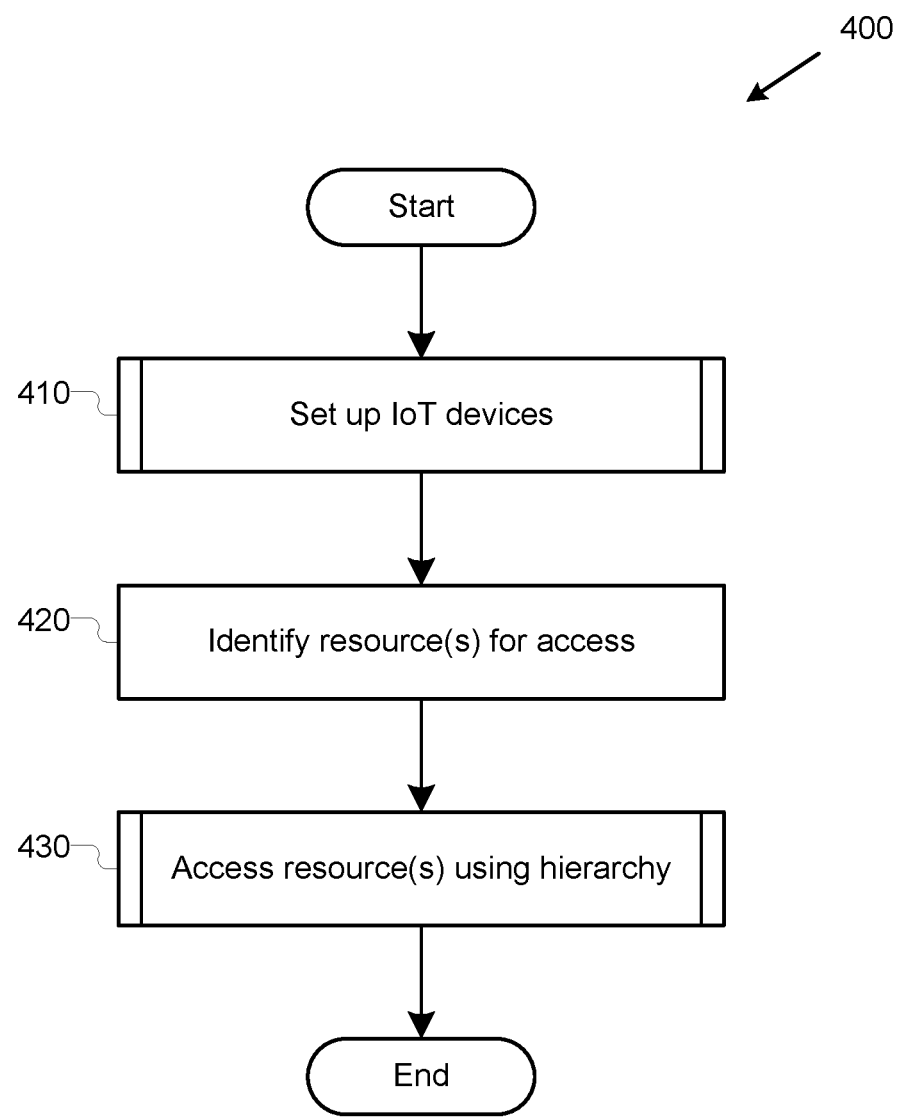
FIG. 4 illustrates an example process for accessing IoT devices in an IoT hierarchy, in accordance with various embodiments.

Referring now to FIG. 4, an example process 400 for accessing IoT devices in an IoT hierarchy is illustrated in accordance with various embodiments. While FIG. 4 illustrates particular operations in a particular order, in various embodiments the operations may be combined, split into parts, and/or omitted. The process may begin at operation 410, where one or more IoT devices may be set up. For example, at operation 410, IoT devices may be brought online determined within the IoT device hierarchy, and/or have their presence (and IoT device hierarchy information) made available to other IoT devices and/or client applications. Particular embodiments of the process of operation 410 may be described below with reference to process 500 of FIG. 5. Next, at operation 420, one or more resources of an IoT device may be identified for access. For example, an IoT client application or a user of one, may identify that a particular light resource should be turned on. In another example, at operation 420 it may be determined that a set of devices in a particular area represented by a particular resource should be accessed. Next, at operation 430, the IoT client application (or other application or user) may access the resource or resources using the IoT hierarchy. Particular embodiments of the process of operation 430 may be described below with reference to processes 600 of FIG. 6 and 700 of FIG. 7. The process may then end.

Figure 5:
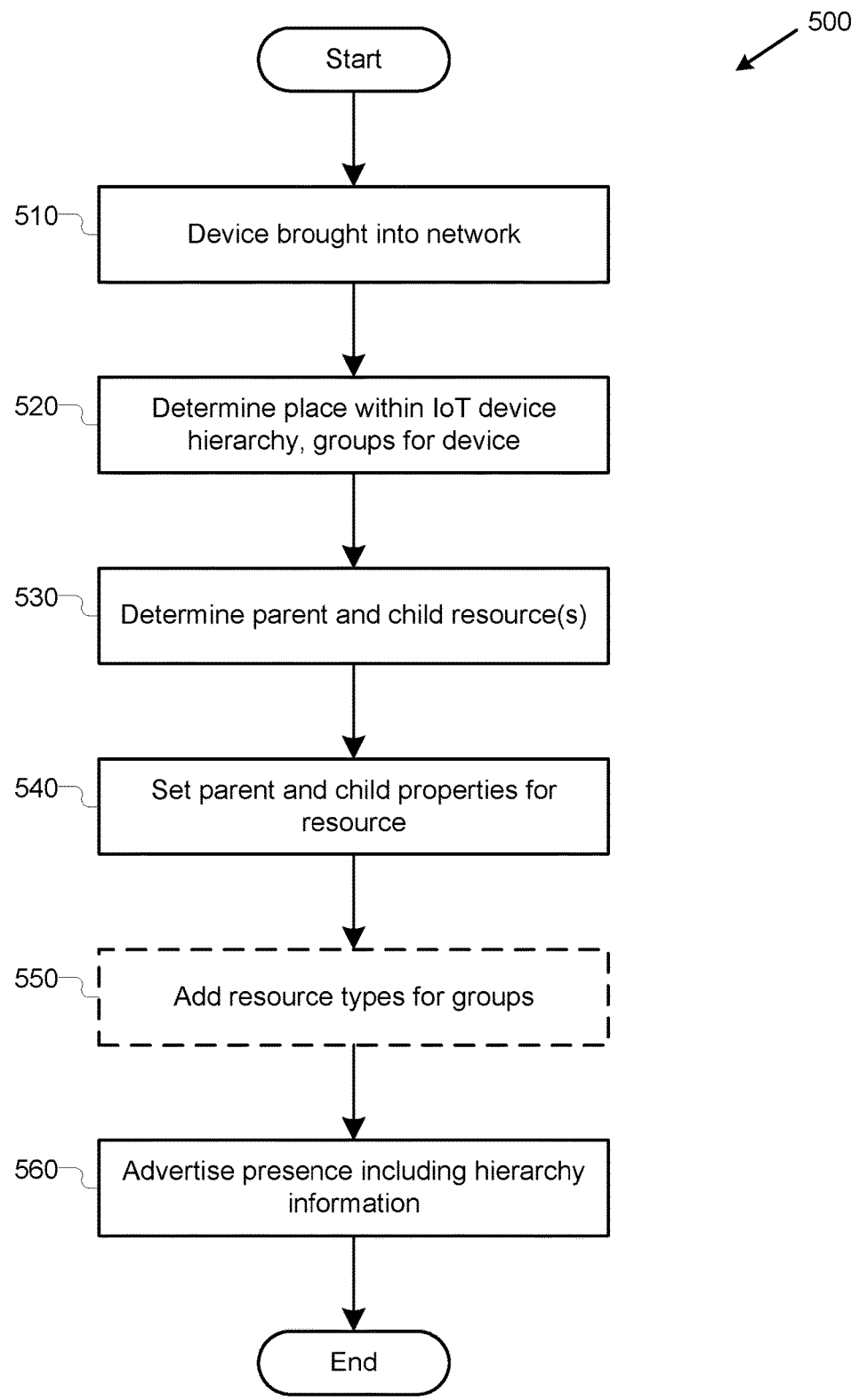
FIG. 5 illustrates an example process for setting up IoT devices in an IoT hierarchy, in accordance with various embodiments.

Referring now to FIG. 5, an example process 500 for setting up IoT devices in an IoT hierarchy is illustrated in accordance with various embodiments. In various embodiments, process 500 may be performed to implement, in whole or in part, operation 410 of process 400 of FIG. 4. While FIG. 5 illustrates particular operations in a particular order, in various embodiments the operations may be combined, split into parts, and/or omitted. The process may begin at operation 510, where the IoT device may be brought into the network. In various embodiments, this may include various known techniques, including, but not limited to, physical movement of an IoT device, imitation or powering-on of an IoT device, connection to a wired or wireless network, direction to an IoT device to join a particular IoT device network, etc. Next, at operation 520, a place may be determined for one or more resources of the IoT device in the IoT device hierarchy. For example, if the device is a light that is in a particular room, it may be determined that a light resource for the IoT device should be a child of a resource representing that room. Next, at operation 530, parent and/or child resources for the new resources may be determined. Thus, in the previous example, a resource representing the room where the light has been added may be identified to be added as a parent resource of the newly-added light resource. In various embodiments, these determinations may be performed by an IoT client application and/or by a user. Next, at operation 540, parent and child resources for the newly-added resource may be set. In various embodiments, at operation 540, a PU 210 and/or CU 220s of the resource may be set with URIs of a parent resource or of child resources, respectively.

Next, at optional operation 550, one or more resource type properties may be added to the resource, such as to place the resource into one or more groups. For example, if a subset of lights are emergency lights, then an "emergency" resource type property could be added to the resources for each of these lights. In such scenarios, the HAI 250 may later be utilized to turn on only those lights that match the particular "emergency" resource type. This would allow for sub-sets of descendant resources, such as all emergency lights in a particular building, or in a particular room, to be turned on or off. After operation 550, at operation 560, the IoT device may advertise the presence of one or more resources provided by the IoT device to other IoT devices or to the IoT client application. As discussed above, this advertisement of presence may include resource type and IoT device hierarchy information, such as the PU 210 and/or CU 220s of each resource, as applicable. The process may then end.

Figure 6:
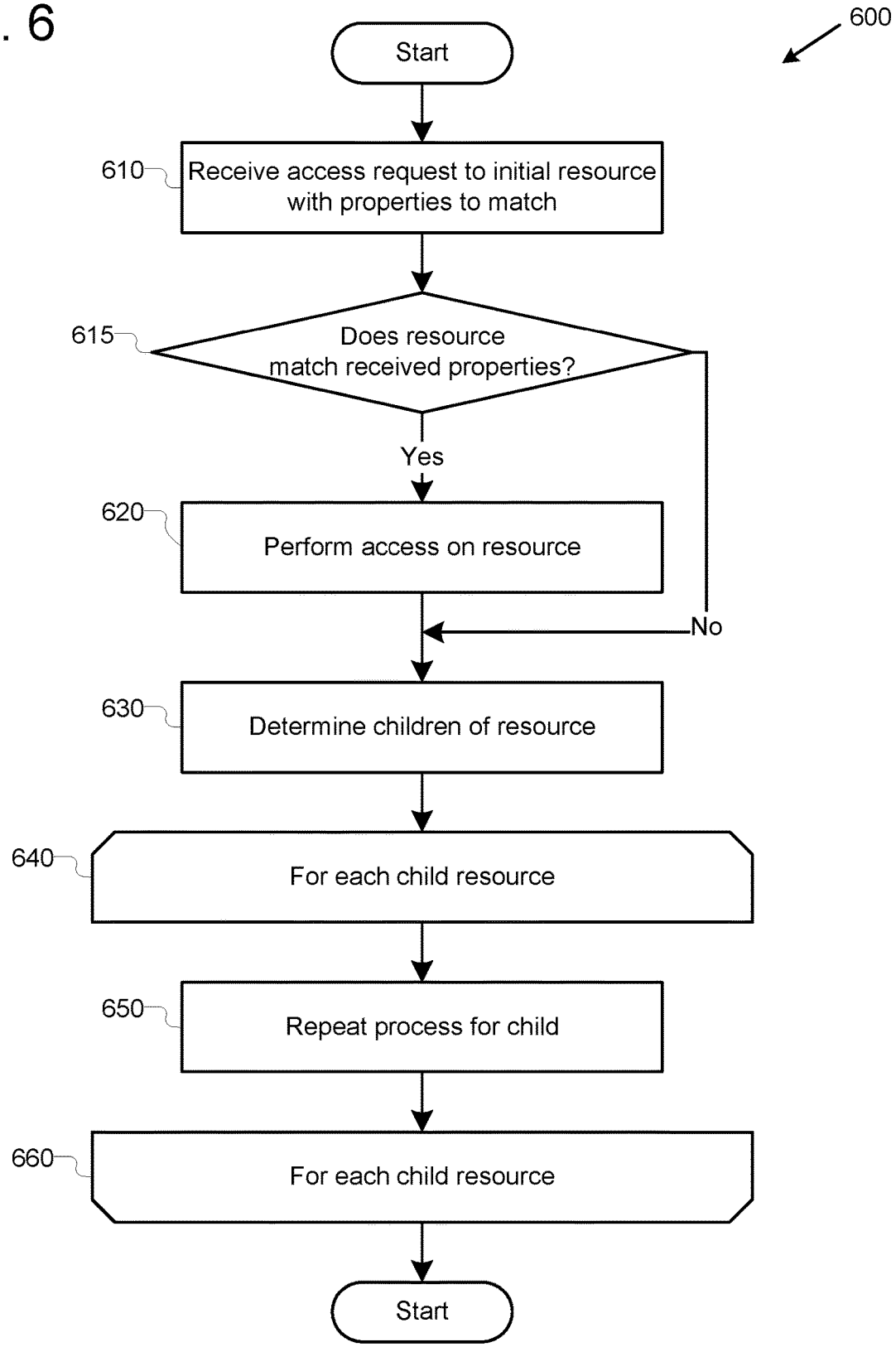
FIG. 6 illustrates an example process for accessing a resource of an IoT device in an IoT hierarchy, in accordance with various embodiments.

Referring now to FIG. 6, an example process 600 for accessing a resource of an IoT device in an IoT hierarchy is illustrated in accordance with various embodiments. In various embodiments, process 600 may be performed to implement, in whole or in part, operation 430 of process 400 of FIG. 4. While FIG. 6 illustrates particular operations in a particular order, in various embodiments the operations may be combined, split into parts, and/or omitted.

In the particular example of FIG. 6, an IoT client application 350 may access multiple resources of an IoT device hierarchy utilizing the HAI 250. The process may begin at operation 610, where an initial resource may receive an access request through its HAI. In various embodiments, this access request through the HAI 250 may include one or more properties which may be matched by the HAI as access proceeds. The example provided above may be recalled:

PUT coap://1.1.1.1/floor/2?IF=tree&RT=LED {Payload: state=ON,power=2,color=R}

As discussed above, using this command an IoT client application may request that every descendant resource that matches the Resource Type "LED" may be set to ON with power 2 and color "R".

Next, at decision operation 615, handler logic associated with the resource may determine whether the resource matches the properties received in the request made through the HAI 250. In the example above, the resource may determine whether it matches the Resource Type LED. In various embodiments, this handler logic may include software and/or hardware components that are part of a device hosting the resource. In other embodiments, multiple properties may be matched, such as if the resource has Resource Types that indicate its being associated with a particular group of resources. If, at decision operation 615, the resource determines that it matches the received properties, then at operation 620, the particular requested access may be performed on the resource itself. For example, a requested attribute, such as the light state may bet set. If at decision operation 615 the properties do not match then no access may be performed.

In either event, the process may then proceed to operation 630, where the resource may determine its children, such as through one or more CU 220s of the resource. After determination of the children of the resource, at loop operation 640, a loop may begin for every child of the resource. In the loop, at operation 650, the process of FIG. 6 may be repeated for the current child. In some embodiments, the repeated process may begin at decision operation 615, as the access request may have already been received. After performance of the process for the current child, the loop may continue for the next child. After completion of the loop for each child resource, the process may then end. In various embodiments, if the process is currently being performed for a child of another resource, a higher-level instance of process 600 may then continue for a sibling resource of the current resource.

Figure 7:
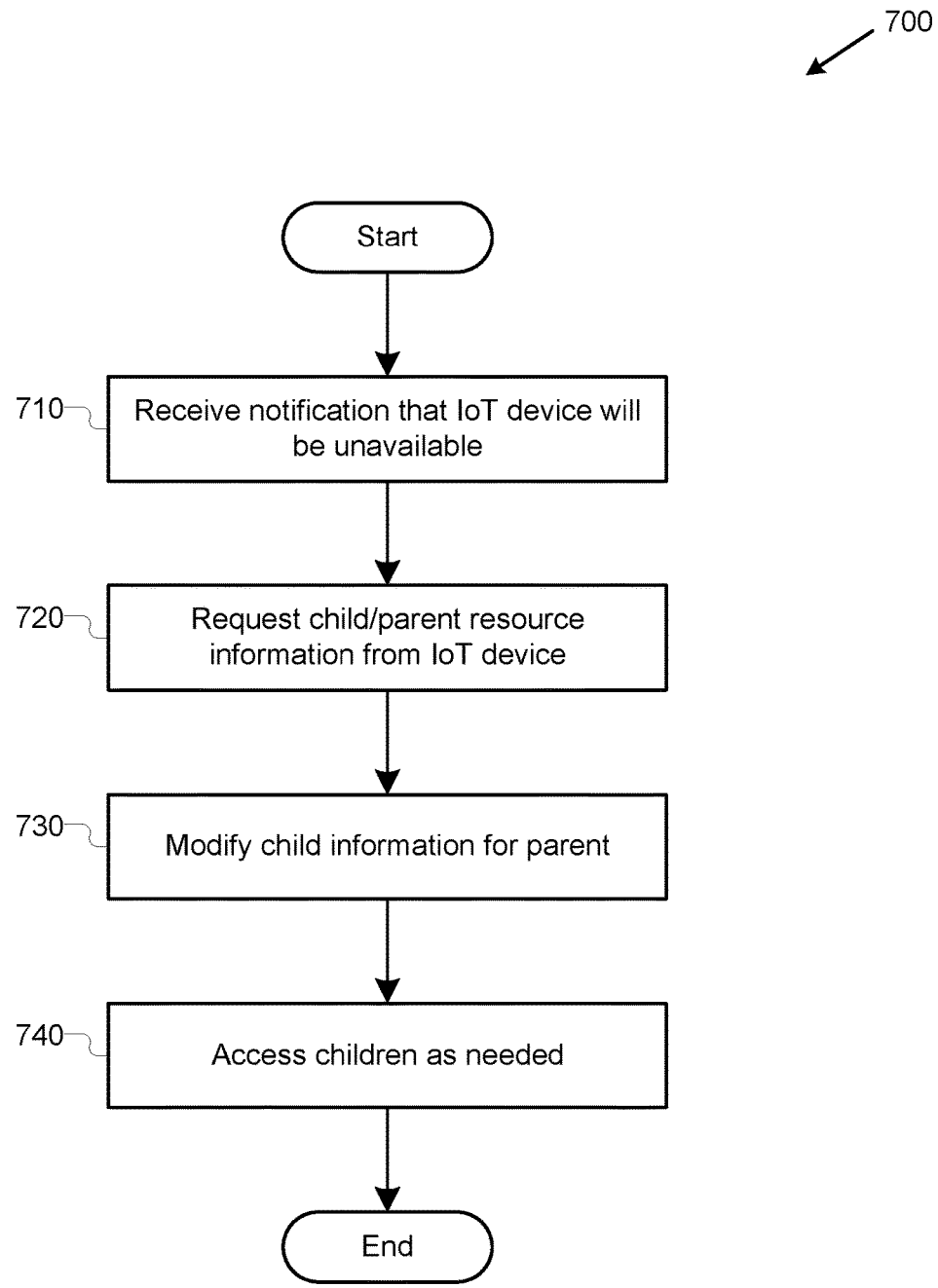
FIG. 7 illustrates another example process for accessing a resource of an IoT device in an IoT hierarchy, in accordance with various embodiments.

Referring now to FIG. 7, another example process 700 for accessing a resource of an IoT device in an IoT hierarchy is illustrated in accordance with various embodiments. In various embodiments, process 700 may be performed to implement, in whole or in part, operation 430 of process 400 of FIG. 4. While FIG. 7 illustrates particular operations in a particular order, in various embodiments the operations may be combined, split into parts, and/or omitted.

In the particular example of FIG. 7, an IoT client application 350 may be receiving information about an IoT device hierarchy when an IoT device leaves (or otherwise becomes unavailable in) an IoT device network. The process may begin at operation 710, where the IoT client application 350 may receive a notification that the IoT device will become unavailable. In response, at operation 720, the IoT client application 350 may request, from a resource of the IoT device, child and parent resource information from the resource, such as by requesting the PU 210 and/or CU 220s of the resource. In alternative embodiments, the resource may provide parent and/or child resource information as part of operation 710. Next, at operation 730, the IoT client application 350 may modify child information for the parent of the affected resource, such as by updating one or more CU 220s to remove the URI of the affected resource. In another example, the IoT client application 350 may set one or more CU 220s of the parent resource to URIs for one or more children resources of the affected resource, thus collapsing/connecting an affected potion of the IoT device hierarchy. Next, the IoT client application 350 may access children of the affected resource as needed. For example, the IoT client application 350 may update PU 210s of the child resources, or may change settings of the child resources as appropriate. The process may then end.

Figure 8:
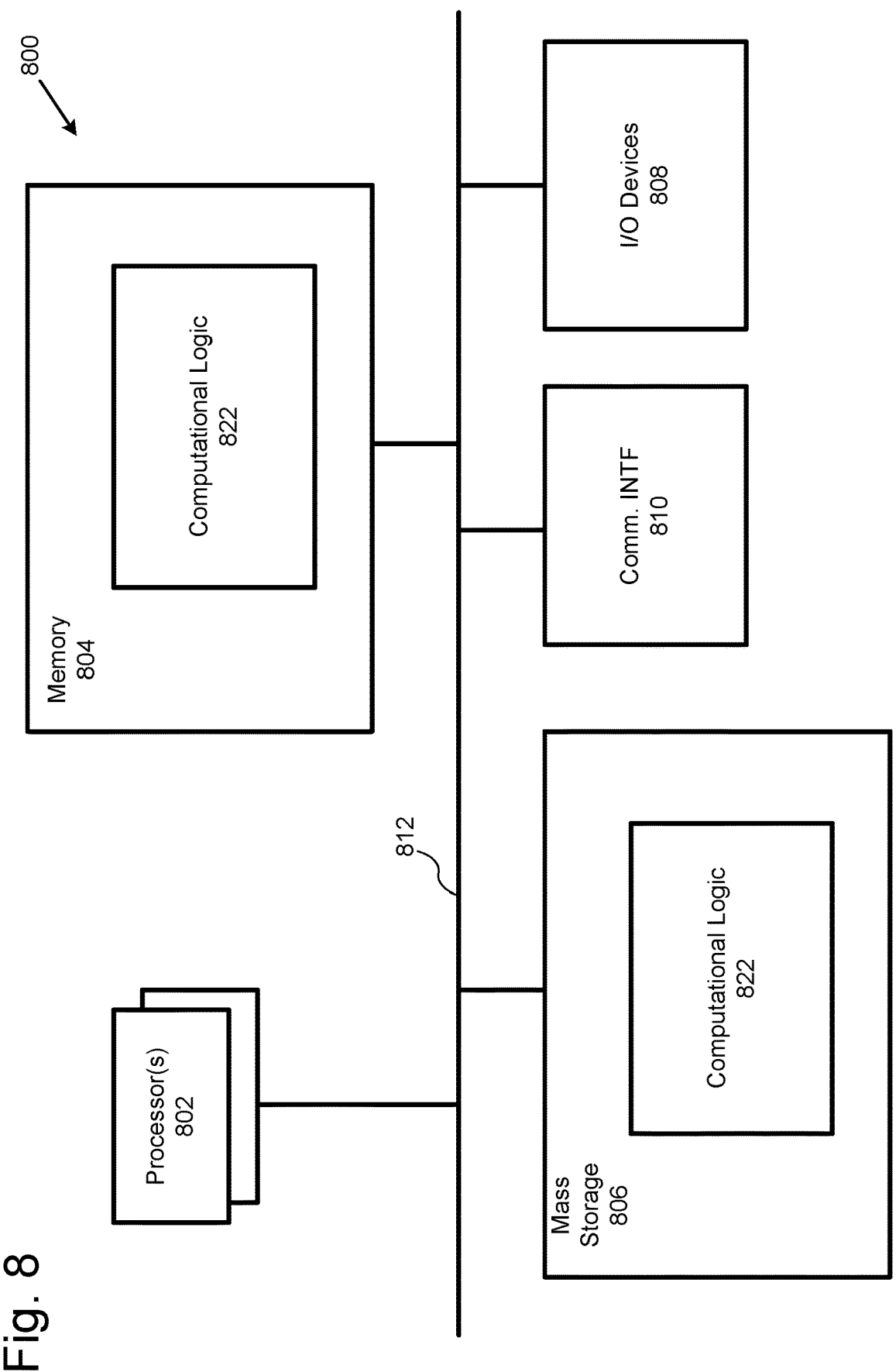
FIG. 8 illustrates an example computing environment suitable for practicing various aspects of the present disclosure, in accordance with various embodiments.

Referring now to FIG. 8, an example computer suitable for practicing various aspects of the present disclosure, including processes of FIGS. 4-7, is illustrated in accordance with various embodiments. As shown, computer 800 may include one or more processors or processor cores 802, and system memory 804. For the purpose of this application, including the claims, the terms "processor" and "processor cores" may be considered synonymous, unless the context clearly requires otherwise. Additionally, computer 800 may include mass storage devices 806 (such as diskette, hard drive, compact disc read only memory (CD-ROM) and so forth), input/output devices 808 (such as display, keyboard, cursor control, remote control, gaming controller, image capture device, and so forth) and communication interfaces 810 (such as network interface cards, modems, infrared receivers, radio receivers (e.g., Bluetooth, Wi-Fi, Near Field Communications, Radio-frequency identification, and so forth). The elements may be coupled to each other via system bus 812, which may represent one or more buses. In the case of multiple buses, they may be bridged by one or more bus bridges (not shown).

Each of these elements may perform its conventional functions known in the art. In particular, system memory 804 and mass storage devices 806 may be employed to store a working copy and a permanent copy of the programming instructions implementing one or more of the operations associated with techniques shown in FIGS. 4-7, collectively referred to as computing logic 822. The various elements may be implemented by assembler instructions supported by processor(s) 802 or high-level languages, such as, for example, C, that can be compiled into such instructions. In various embodiments, the system memory 804 or mass storage 806 may include various memory implementations, including integrated flash memory, such as in a System on a Chip, a USB flash drive, SD Card, on SATA SSD, etc.

The permanent copy of the programming instructions may be placed into permanent storage devices 806 in the factory, or in the field, through, for example, a distribution medium (not shown), such as a compact disc (CD), or through communication interface 810 (from a distribution server (not shown)). In embodiments, the programming instructions may be stored in one or more computer readable non-transitory storage media. In other embodiments, the programming instructions may be encoded in transitory storage media, such as signals.

The number, capability and/or capacity of these elements 810-812 may vary. Their constitutions are otherwise known, and accordingly will not be further described.

Figure 9:
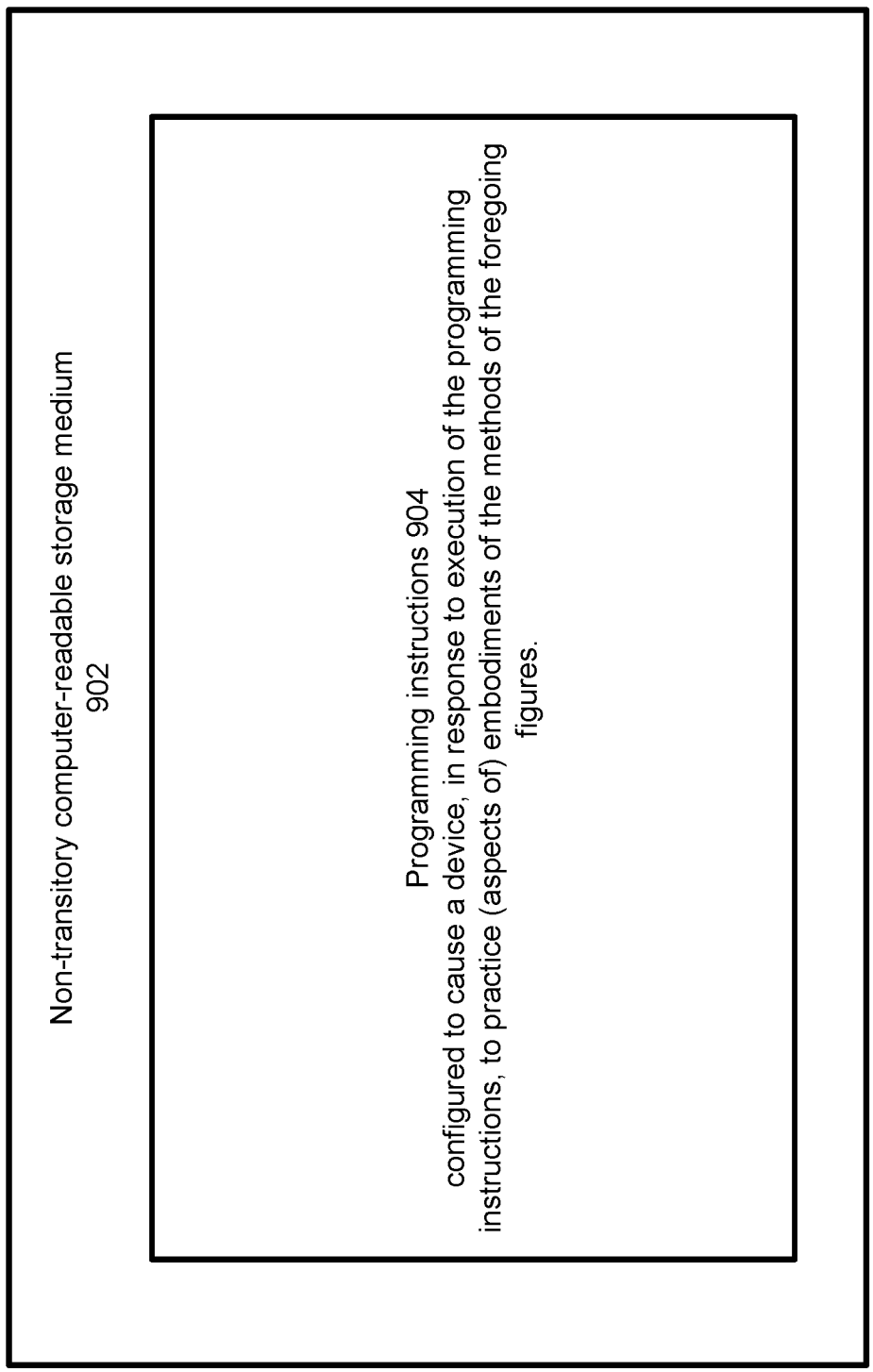
FIG. 9 illustrates an example storage medium with instructions configured to enable an apparatus to practice various aspects of the present disclosure, in accordance with various embodiments.

FIG. 9 illustrates an example least one computer-readable storage medium 902 having instructions configured to practice all or selected ones of the operations associated with the techniques earlier described, in accordance with various embodiments. As illustrated, least one computer-readable storage medium 902 may include a number of programming instructions 904. Programming instructions 904 may be configured to enable a device, e.g., computer 800, in response to execution of the programming instructions, to perform, e.g., various operations of processes of the figures described above, e.g., but not limited to, to the various operations performed to perform IoT device hierarchy techniques described herein In alternate embodiments, programming instructions 904 may be disposed on multiple least one computer-readable storage media 902 instead.

Referring back to FIG. 8, for one embodiment, at least one of processors 802 may be packaged together with a memory having computational logic 822 configured to practice aspects of processes of FIGS. 4-7. For one embodiment, at least one of processors 802 may be packaged together with a memory having computational logic 822 configured to practice aspects of processes of FIGS. 4-7 to form a System in Package (SiP). For one embodiment, at least one of processors 802 may be integrated on the same die with a memory having computational logic 822 configured to practice aspects of processes of FIGS. 4-7. For one embodiment, at least one of processors 802 may be packaged together with a memory having computational logic 822 configured to practice aspects of processes of FIGS. 4-7 to form a System on Chip (SoC). For at least one embodiment, the SoC may be utilized in, e.g., but not limited to, a computing tablet. (e.g., Wi-Fi, Blue Tooth, Blue Tooth Low Energy, Near Field Communications, Radio-frequency identification (RFID), etc.) and other components as necessary to meet functional and non-functional requirements of the system.

Computer-readable media (including at least one computer-readable media), methods, apparatuses, systems and devices for performing the above-described techniques are illustrative examples of embodiments disclosed herein. Additionally, other devices in the above-described interactions may be configured to perform various disclosed techniques. Particular examples of embodiments, described herein include, but are not limited to, the following:

Example 1 may include an Internet of Things (IoT) device, including a resource and an actuator coupled with the resource to set one or more attributes of the resource. The resource may be associated with a unique resource identifier (URI) and a plurality of properties. The URI may uniquely identify the resource among a plurality of resources disposed among IoT devices of an IoT device hierarchy. The plurality of properties may include a hierarchical interface property that indicates the resource may be accessible in a hierarchical manner, wherein the hierarchical interface property may be at least one of a parent URI property or a child URI property. The parent URI property, when included, may have a property value that identifies a parent URI of a parent resource of the plurality of resources which has a parent resource relationship to the resource in the IoT device hierarchy. The child URI property, when included, may have a property value that identifies a child URI of a child resource of the plurality of resources which has a child resource relationship to the resource.

Example 2 may include the IoT device of example 2, wherein the plurality of properties further may include an interface type property which indicates that the IoT device may be associated with a hierarchical access interface to provide access to one or more descendant resources which are subordinate to the resource in the IoT device hierarchy.

Example 3 may include the IoT device of example 2, wherein the hierarchical access interface may be further to, in response to receipt of a property, provide access to resources which are descendants of the resource in the IoT device hierarchy and which match the received property.

Example 4 may include the IoT device of example 3, wherein the hierarchical access interface may be to facilitate retrieval of information about the one or more resources which are descendants of the resource.

Example 5 may include the IoT device of example 3, wherein the hierarchical access interface may be to facilitate setting of attributes to the one or more resources which are descendants of the resource.

Example 6 may include the IoT device of any of examples 1-5, and may further include a resource access module to respond to a request for properties of the resource with the hierarchical interface property.

Example 7 may include the IoT device of any of examples 1-6, wherein the plurality of properties may include a plurality of parent URI properties.

Example 8 may include the IoT device of any of examples 1-7, wherein the plurality of properties may include a plurality of child URI properties.

Example 9, may include the IoT device of any of examples 1-8, wherein the IoT device hierarchy may include parent/child relationships between one or more of: a pair of device resources, a device resource and a resource representing a grouping of devices, and a pair of resources representing groupings of devices.

Example 10 may include one or more computer-readable media containing instructions written thereon that, in response to execution by a Internet of Things (IoT) device, cause the device to facilitate access to a resource associated with the IoT device. The instructions may cause the IoT device to respond to requests sent to a unique resource identifier (URI) associated with the device to set attributes of the resource, wherein the URI uniquely identifies the resource among a plurality of resources disposed among IoT devices of an IoT device hierarchy and respond to requests for properties of the IoT device with a plurality of properties. The plurality of properties may include a hierarchical interface property that indicates the resource may be accessible in a hierarchical manner, wherein the hierarchical interface property may be at least one of a parent URI property or a child URI property. The parent URI property, when included, may have a property value that identifies a parent URI of a parent resource of the plurality of resources which has a parent resource relationship to the resource in the IoT device hierarchy The child URI property, when included, may have a property value that identifies a child URI of a child resource of the plurality of resources which has a child resource relationship to the resource.

Example 11 may include the computer-readable media of example 10, wherein respond to requests for properties may include respond with an interface type property that indicates that the IoT device may be associated with a hierarchical access interface to provide access to one or more descendant resources which are subordinate to the resource in the IoT device hierarchy.

Example 12 may include the computer-readable media of example 11, wherein the instructions may be further to cause the IoT device to provide the hierarchical access interface.

Example 13 may include the computer-readable media of example 12, wherein provide the hierarchical access interface may include, in response to receipt of a property, provide access to resources which are descendants of the resource in the IoT device hierarchy and which match the received property.

Example 14 may include the computer-readable media of example 12, wherein provide the hierarchical access interface may include facilitate retrieval of information about the one or more resources which are descendants of the resource.

Example 15 may include the computer-readable media of example 13, wherein provide the hierarchical access interface may include facilitate setting of attributes to the one or more resources which are descendants of the resource.

Example 16 may include the computer-readable media of any of examples 10-15, wherein respond to requests for properties may include respond with a plurality of parent URI properties.

Example 17 may include the computer-readable media of any of examples 10-16, wherein respond to requests for properties may include respond with a plurality of child URI properties.

Example 18 may the computer-readable media of any of examples 10-17, wherein the IoT device hierarchy may include parent/child relationships between one or more of: a pair of device resources, a device resource and a resource representing a grouping of devices, and a pair of resources representing groupings of devices.

Example 19 may include a computer-implemented method for an Internet of Things (IoT) device to facilitate access to a resource associated with the IoT device. The method may include responding, by the IoT device, to requests sent to a unique resource identifier (URI) associated with the device to set attributes of the resource, wherein the URI uniquely identifies the resource among a plurality of resources disposed among IoT devices of an IoT device hierarchy. The method may also include responding, by the IoT device, to requests for properties of the IoT device with a plurality of properties. The plurality of properties may include a hierarchical interface property that indicates the resource may be accessible in a hierarchical manner, wherein the hierarchical interface property may be at least one of a parent URI property or a child URI property. The parent URI property, when included, may have a property value that identifies a parent URI of a parent resource of the plurality of resources which has a parent resource relationship to the resource in the IoT device hierarchy. The child URI property, when included, may have a property value that identifies a child URI of a child resource of the plurality of resources which has a child resource relationship to the resource.

Example 20 may include the computer-implemented method of example 19, wherein responding to requests for properties may include responding with an interface type property that indicates that the IoT device may be associated with a hierarchical access interface to provide access to one or more descendant resources which are subordinate to the resource in the IoT device hierarchy.

Example 21 may include the computer-implemented method of example 20, and may further include providing, by the IoT device, the hierarchical access interface.

Example 22 may include the computer-implemented method of example 21, wherein providing the hierarchical access interface may include, in response to receipt of a property, providing access to resources which are descendants of the resource in the IoT device hierarchy and which match the received property.

Example 23 may include the computer-implemented method of example 21, wherein providing the hierarchical access interface may include facilitating retrieval of information about the one or more resources which are descendants of the resource.

Example 24 may include the computer-implemented method of example 21, wherein providing the hierarchical access interface may include facilitating setting of attributes to the one or more resources which are descendants of the resource.

Example 25 may include the computer-implemented method of any of examples 19-24, wherein responding to requests for properties may include responding with a plurality of parent URI properties.

Example 26 may include the computer-implemented method of any of examples 19-25, wherein responding to requests for properties may include responding with a plurality of child URI properties.

Example 27 may include the computer-implemented method of any of examples 19-26, wherein the IoT device hierarchy may include parent/child relationships between one or more of: a pair of device resources, a device resource and a resource representing a grouping of devices, and a pair of resources representing groupings of devices.

Example 28 may include an Internet of Things (IoT) device to facilitate access to a resource associated with the IoT device. The IoT device may include means for responding to requests sent to a unique resource identifier (URI) associated with the device to set attributes of the resource, wherein the URI uniquely identifies the resource among a plurality of resources disposed among IoT devices of an IoT device hierarchy and means for responding to requests for properties of the IoT device with a plurality of properties. The plurality of properties may include a hierarchical interface property that indicates the resource may be accessible in a hierarchical manner, wherein the hierarchical interface property may be at least one of a parent URI property or a child URI property. The parent URI property, when included, may have a property value that identifies a parent URI of a parent resource of the plurality of resources which has a parent resource relationship to the resource in the IoT device hierarchy. The child URI property, when included, may have a property value that identifies a child URI of a child resource of the plurality of resources which has a child resource relationship to the resource.

Example 29 may include the IoT device of example 28, wherein means for responding to requests for properties may include means for responding with an interface type property that indicates that the IoT device may be associated with a hierarchical access interface to provide access to one or more descendant resources which are subordinate to the resource in the IoT device hierarchy.

Example 30 may include the IoT device of example 29, and may further include means for providing the hierarchical access interface.

Example 31 may include the IoT device of example 30, wherein means for providing the hierarchical access interface may include means for, in response to receipt of a property, providing access to resources which are descendants of the resource in the IoT device hierarchy and which match the received property.

Example 32 may include the IoT device of example 30, wherein means for providing the hierarchical access interface may include means for facilitating retrieval of information about the one or more resources which are descendants of the resource.

Example 33 may include the IoT device of example 30, wherein means for providing the hierarchical access interface may include means for facilitating setting of attributes to the one or more resources which are descendants of the resource.

Example 34 may include the IoT device of any of examples 28-33, wherein means for responding to requests for properties may include means for responding with a plurality of parent URI properties.

Example 35 may include the IoT device of any of examples 28-34, wherein means for responding to requests for properties may include means for responding with a plurality of child URI properties.

Example 36 may include the IoT device of any of examples 28-35, wherein the IoT device hierarchy may include parent/child relationships between one or more of: a pair of device resources, a device resource and a resource representing a grouping of devices, and a pair of resources representing groupings of devices.

Example 37 may include one or more computer-readable media containing instructions written thereon that, in response to execution by a computing system, cause the computing system to access a resource. The instructions may cause the computing system to identify a first resource of an Internet of Things (IoT) device, wherein the first resource may be among a plurality of resources disposed among IoT devices of an IoT device hierarchy. The instructions may also cause the computing system to receive a hierarchical interface property associated with the first resource that indicates the resource may be accessible in a hierarchical manner, the hierarchical interface property including at least one of a parent URI property or a child URI property. The instructions may also cause the computing system to, based on the at least one of the parent URI property or the child URI property, determine a hierarchical relationship between the first resource and a second resource, wherein the second resource may be a parent or child of the first resource in the IoT device hierarchy.

Example 38 may include the apparatus of example 37, wherein the instructions may further cause the computing system to: receive an indication that the first resource may be no longer accessible or will no longer be accessible; request at least one of a parent URI property or a child URI property may include request the parent URI property; and, based at least in part on the received parent URI property, access at least one of a parent resource or a child resource for the first resource.

Example 39 may include the apparatus of any of examples 37 or 38, wherein the instructions may be further to cause the computing system to: receive an interface type property that indicates that the IoT device may be associated with a hierarchical access interface; and access, using a hierarchical access interface associated with the first resource, one or more resources which are descendants of the first resource in the IoT device hierarchy.

Example 40 may include the apparatus of any of examples 37-39, wherein the IoT device hierarchy may include parent/child relationships between one or more of: a pair of device resources, a device resource and a resource representing a grouping of devices, and a pair of resources representing groupings of devices.

Example 41 may include a computer-implemented method for accessing a resource, including: identifying, by a computing system, a first resource of an Internet of Things (IoT) device, the first resource may be among a plurality of resources disposed among IoT devices of an IoT device hierarchy; receiving, by the computing system, a hierarchical interface property associated with the first resource that indicates the resource may be accessible in a hierarchical manner, the hierarchical interface property including at least one of a parent URI property or a child URI property; and based on the at least one of the parent URI property or the child URI property determining, by the computing system, a hierarchical relationship between the first resource and a second resource, wherein the second resource may be a parent or child of the first resource in the IoT device hierarchy.

Example 42 may include the computer-implemented method of example 41, and may further include: receiving, by the computing system, an indication that the first resource may be no longer accessible or will no longer be accessible; requesting, by the computing system, at least one of a parent URI property or a child URI property may include request the parent URI property; and, based at least in part on the received parent URI property, accessing, by the computing system, at least one of a parent resource or a child resource for the first resource.

Example 43 may include the computer-implemented method of any of examples 41 or 42, and may further include: receiving, by the computing system, an interface type property that indicates that the IoT device may be associated with a hierarchical access interface; and accessing, by the computing system, using a hierarchical access interface associated with the first resource, one or more resources which are descendants of the first resource in the IoT device hierarchy.

Example 44 may include the computer-implemented method of any of examples 41-43, wherein the IoT device hierarchy may include parent/child relationships between one or more of: a pair of device resources, a device resource and a resource representing a grouping of devices, and a pair of resources representing groupings of devices.

Example 45 may include an apparatus for accessing a resource, including: means for identifying a first resource of an Internet of Things (IoT) device, the first resource may be among a plurality of resources disposed among IoT devices of an IoT device hierarchy; means for receiving a hierarchical interface property associated with the first resource that indicates the resource may be accessible in a hierarchical manner, the hierarchical interface property including at least one of a parent URI property or a child URI property; and means for determining, based on the at least one of the parent URI property or the child URI property, a hierarchical relationship between the first resource and a second resource, wherein the second resource may be a parent or child of the first resource in the IoT device hierarchy.

Example 46 may include the apparatus of example 45, and may further include: means for receiving an indication that the first resource may be no longer accessible or will no longer be accessible; means for requesting at least one of a parent URI property or a child URI property may include request the parent URI property; and means for accessing, based at least in part on the received parent URI property, at least one of a parent resource or a child resource for the first resource.

Example 47 may include the apparatus of any of examples 45 or 46, and may further include: means for receiving an interface type property that indicates that the IoT device may be associated with a hierarchical access interface; and means for accessing, using a hierarchical access interface associated with the first resource, one or more resources which are descendants of the first resource in the IoT device hierarchy.

Example 48 may include the apparatus of any of examples 45-47, wherein the IoT device hierarchy may include parent/child relationships between one or more of: a pair of device resources, a device resource and a resource representing a grouping of devices, and a pair of resources representing groupings of devices.

Although certain embodiments have been illustrated and described herein for purposes of description, a wide variety of alternate and/or equivalent embodiments or implementations calculated to achieve the same purposes may be substituted for the embodiments shown and described without departing from the scope of the present disclosure. This application is intended to cover any adaptations or variations of the embodiments discussed herein. Therefore, it is manifestly intended that embodiments described herein be limited only by the claims.

Where the disclosure recites "a" or "a first" element or the equivalent thereof, such disclosure includes one or more such elements, neither requiring nor excluding two or more such elements. Further, ordinal indicators (e.g., first, second or third) for identified elements are used to distinguish between the elements, and do not indicate or imply a required or limited number of such elements, nor do they indicate a particular position or order of such elements unless otherwise specifically stated.

What is claimed is:

1. At least one storage device comprising instructions that, when executed, cause at least one processor to at least:
   identify a first hierarchical group of IoT devices to which a first IoT device is to be added, the first hierarchical group being a child group to a second hierarchical group of IoT devices, the first hierarchical group being a parent group to a third hierarchical group of IoT devices;
   add the first IoT device to the first hierarchical group of IoT devices;
   add a second IoT device to the second hierarchical group of IoT devices;
   access a request to perform an operation on the second hierarchical group of IoT devices;
   perform the operation on the second hierarchical group of IoT devices and the first hierarchical group of IoT devices, the operation to be performed on the first hierarchical group of IoT devices as a result of the first hierarchical group of IoT devices being a child group to the second hierarchical group of IoT devices.

2. The at least one storage device of claim 1, wherein the instructions, when executed, cause the at least one processor to apply an attribute to the second hierarchical group of IoT devices.

3. The at least one storage device of claim 2, wherein the request is a first request and the instructions, when executed, cause the at least one processor to access a second request to execute a job based on the attribute.

4. The at least one storage device of claim 2, wherein the attribute is represented as a name and value pair.

5. The at least one storage device of claim 1, wherein the instructions, when executed, cause the at least one processor to at least access a job request to execute a job at the first hierarchical group, the job request to identify an action to be performed by one or more of the IoT devices in the first hierarchical group.

6. The at least one storage device of claim 5, wherein the instructions, when executed, cause the at least one processor to at least:
   cause communication of a first notification to the first IoT device to identify the job; and
   cause communication of a second notification to the second IoT device to identify the job.

7. The at least one storage device of claim 6, wherein the second hierarchical group of IoT devices includes a third IoT device, and the instructions, when executed, cause the at least one processor to cause communication of a third notification to the third IoT device to identify the job.

8. A server comprising:
   at least one storage device;
   at least one processor to execute machine readable instructions to cause the at least one processor to at least:
   identify a first set of IoT devices to which a first IoT device is to be added, the first set being a child set to a second set of IoT devices, the second set being a child set to a third set of IoT devices;
   associate the first IoT device to the first set of IoT devices;
   associate a second IoT device to the second set of IoT devices;
   access a request to perform an operation on the second set of IoT devices;
   perform the operation on the second set of IoT devices and the first set of IoT devices, the operation to be performed on the first set of IoT devices as a result of the first set of IoT devices being a child set to the second set of IoT devices.

9. The server of claim 8, wherein the at least one processor is to apply an attribute to the second set of IoT devices.

10. The server of claim 9, wherein the request is a first request and the at least one processor is to access a second request to execute a job based on the attribute.

11. The server of claim 9, wherein the attribute is represented as a name and value pair.

12. The server of claim 8, wherein the at least one processor is to at least access a job request to execute a job at the first set, the job request to identify an action to be performed by one or more of the IoT devices in the first set.

13. The server of claim 12, wherein the at least one processor is to at least:
   cause communication of a first notification to the first IoT device to identify the job; and
   cause communication of a second notification to the second IoT device to identify the job.

14. The server of claim 13, wherein the second set of IoT devices includes a third IoT device, and the at least one processor is to cause communication of a third notification to the third IoT device to identify the job.

15. A method of operating a server, the method comprising:
   identifying a first hierarchical group of IoT devices to which a first IoT device is to be added, the first hierarchical group being a child group to a second hierarchical group of IoT devices, the second hierarchical group of IoT devices being a child group to a third hierarchical group of IoT devices;
   adding the first IoT device to the first hierarchical group;
   adding a second IoT device to the second hierarchical group of IoT devices;
   accessing a request to perform an operation on the second hierarchical group of IoT devices;
   causing performance of the operation on the second hierarchical group of IoT devices and the first hierarchical group of IoT devices, the operation to be performed on the first hierarchical group of IoT devices as a result of the first hierarchical group of IoT devices being a child group to the second hierarchical group of IoT devices.

16. The method of claim 15, wherein the performance of the operation includes applying an attribute to the second group hierarchical group of IoT devices.

17. The method of claim 16, wherein the request is a first request and further including accessing a second request to execute a job based on the attribute.

18. The method of claim 16, wherein the attribute is represented as a name and value pair.

19. The method of claim 15, further including accessing a job request to execute a job at the first hierarchical group, the job request to identify an action to be performed by one or more of the IoT devices in the first hierarchical group.

20. The method of claim 19, further including:
   communicating a first notification to the first IoT device to identify the job; and communicating a second notification to the second IoT device to identify the job.

21. The method of claim 20, wherein the second hierarchical group of IoT devices includes a third IoT device and further including communicating a third notification to the third IoT device to identify the job.

* * * * *